(12) United States Patent
Bruening et al.

(10) Patent No.: US 7,051,502 B2
(45) Date of Patent: May 30, 2006

(54) MACHINE FOR MOWING STALK-LIKE CROPS

(75) Inventors: Ulrich Bruening, Coesfeld (DE); Frank Kemper, Stadtlohn (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 0 days.

(21) Appl. No.: 10/813,146

(22) Filed: Mar. 30, 2004

(65) Prior Publication Data

US 2004/0200201 A1    Oct. 14, 2004

(30) Foreign Application Priority Data

Apr. 2, 2003    (DE) ................ 103 14 859

(51) Int. Cl.
*A01D 45/02*    (2006.01)
(52) U.S. Cl. .......................................... 56/51
(58) Field of Classification Search ............... 56/53, 56/71, 503, 51, 80, 94, 119
See application file for complete search history.

(56) References Cited

U.S. PATENT DOCUMENTS

| 4,207,726 | A | * | 6/1980 | Lippl | 56/13.9 |
| 4,292,789 | A | * | 10/1981 | Mathews | 56/12.7 |
| 5,129,219 | A | * | 7/1992 | Baker | 56/53 |
| 6,318,055 | B1 | * | 11/2001 | Bird | 56/6 |
| 6,502,378 | B1 | * | 1/2003 | Wubbels et al. | 56/103 |

FOREIGN PATENT DOCUMENTS

| DE | 3419516 A1 | * | 11/1985 |
| DE | 195 27 607 A1 | | 1/1997 |
| DE | 195 31 918 A1 | | 6/1997 |
| DE | 198 56 444 A1 | | 6/2000 |
| EP | 504639 A1 | * | 9/1992 |
| EP | 1 177 718 A1 | | 2/2002 |
| GB | 2 012 154 A | | 7/1979 |

* cited by examiner

*Primary Examiner*—Thomas B. Will
*Assistant Examiner*—Alicia Torres

(57) ABSTRACT

A machine for mowing crop is equipped several intake and mowing arrangements disposed in side-by-side relationship to each other for the cutting of standing crop and for the conveying of the harvested crop. At the rear side of the intake and mowing arrangements, a transverse conveying channel is provided through which the harvested crop can be transported at least approximately transverse to the direction of operation. The downstream end of the transverse conveying channel communicates with an intake channel through which the harvested crop can be delivered to a chopper arrangement. A conveying arrangement, that can be driven, is arranged outside the transverse conveying channel in order to remove a jam, if necessary, that was caused by harvested crop emerging from the transverse conveying channel. The conveying arrangement is mounted for rotation about an approximately vertical axis.

6 Claims, 2 Drawing Sheets

MACHINE FOR MOWING STALK-LIKE CROPS

FIELD OF THE INVENTION

The invention concerns a machine for mowing stalk-like crops, with several intake and mowing arrangements arranged alongside each other for mowing and conveying the harvesting crop rearward to a transverse conveying channel through which the cut harvested crop can be transported at least approximately transverse to the forward direction of operation. An intake channel is arranged at the downstream end of the transverse conveying channel through which the harvested crop can be delivered to a chopper arrangement. A driven conveying arrangement is arranged outside of the transverse conveying channel, in order to remove a jam if necessary, that is caused by harvested crop emerging from the transverse conveying channel.

BACKGROUND OF THE INVENTION

It happens occasionally that only one or two rows of plants at the edge of a field remain standing during the harvest of stalk-like crop, for example, during the harvest of silage corn. These plant rows can be cut and drawn in only by the outer mowing and intake drums of the machine. With a very wide machine (for example, in a configuration encompassing eight or ten plant rows) the plants must be transported over a longer path through the transverse conveying channel to the center of the machine. Since no further plants are being supplied to the central mowing and intake drums, the plants that have been cut are not retained in the transverse conveying channel by material entering the transverse conveying channel, but lie relatively loosely in it. Due to a high center of gravity, the plants can constantly bend downward during the transport in the transverse conveying channel and then slide out of the transverse conveying channel with their lower ends. In a configuration according to EP 1 177 718 A, slope conveyor drums with approximately vertical axes of rotation are arranged at the side of the intake channel for the purpose of conveying the plants into the intake channel. However, the slope conveyor drums are not in a position to grasp the plants that extend with their lower ends projecting out of the transverse conveying channel. These plants lie across the inlet of the transverse conveyor drum and block any further flow of the crop. The clamping effect could be improved by narrowing the transverse conveying channel, but problems with the throughput will occur during normal operation, that is, when plants are being supplied over the entire width of the machine.

To solve this problem, EP 1 177 718 A proposes a conveying arrangement that is driven in rotation above the intake channel and located ahead of the transverse conveying channel in the direction of operation, which conveys plants that emerge from the transverse conveying channel again into the latter. The conveying arrangement is brought into rotation about a preferably horizontal axis, that extends transverse to the direction of operation. Its speed must therefore be sufficient to bring the plants again into the transverse conveying channel. When plants come to lie on the conveying arrangement, the conveying effect of the conveying arrangement relies only on the force of gravity, which may not be adequate in some cases, since the conveying arrangement slides along the plants.

SUMMARY OF THE INVENTION

The problem underlying the invention is seen in the need to improve the conveying of crop in a machine for mowing stalk-like harvested crop, particularly when only a part of the mowing and intake drums are supplied with plant material.

This problem is solved according to the invention by providing a conveying arrangement located outside the transverse channel through which stalk-like harvested crops are being conveyed inwardly towards a centrally located intake channel for a chopper arrangement.

It is proposed that the conveying arrangement be provided with a vertical or at least approximately vertical axis of rotation. The direction of rotation is selected in such a way that plants emerging from the transverse conveying channel are again brought into the transverse conveying channel or are directed to the intake conveying channel for the chopper arrangement.

The selection of the axis of rotation according to the invention makes possible a forceful and active conveying of the plants, since the conveying effect is not limited by the force of gravity of the plants. Moreover the plants can be guided back into the transverse or intake channels by the shape of the conveying arrangement.

In a preferred embodiment of the invention, an inner pair of intake and mowing arrangements are arranged alongside each other ahead of, and respectively to opposite sides of the intake channel, with a conveying arrangement being attached above each of the inner pair of intake and mowing arrangements. It would also be conceivable to attach one or more conveying arrangements further outward along the transverse conveying channel. In another embodiment, one or more conveying arrangements is, or are, positioned between two intake and mowing arrangements arranged to each side of the intake channel, although it would also be conceivable to attach them above an intake and mowing arrangement that is positioned centrally ahead of the intake channel.

An obvious solution is offered in particular by arranging the conveying arrangement on a plate that is attached to one or more intake and mowing arrangements arranged ahead of the intake channel. These plates are also designated as a center table.

There are a number of possibilities with regard to the shape of the conveying arrangement. On the one hand, it may be a flat conveyor disk, preferably equipped with drivers projecting upward. On the other hand, a smooth conveyor drum could be used or one equipped with drivers. Any other desired shape could be applied. The preferred shape is a combination in which a conveyor drum is arranged above a conveyor disk, particularly coaxially. In all the cases mentioned, the drivers can be attached rigidly to the conveyor disk or conveyor drum, although controlled drivers are also conceivable. Thereby the drivers can project more or less far outward from the conveyor disk or the conveyor drum as a function of their immediate angular position, such as the fingers of a screw conveyor of a cutter head and/or pivoted as the tines of a reel of a cutter head. In a preferred embodiment, the drivers are rigid and bent in a trailing direction opposite to the direction of rotation, in order to provide them with a rejecting conveying performance.

Furthermore, it is proposed that the drive of the conveying arrangement be configured so that is can be turned off and/or reversed. The drive can be put into operation only as required by the operator of the machine or by means of a special sensor that detects a plant emerging from the transverse conveying channel.

In view of the simple constructive configuration, a drive is preferred that is coupled permanently with the intake and mowing arrangements. If the drive of the machine is reversed in the case of a jam of the harvested crop, then the conveying arrangement is also reversed automatically, so that it can support the removal of the jammed material from the intake channel. In this embodiment, there is a particular advantage in the conveying arrangement which can convey the jammed material consisting of harvested crop back into the intake channel immediately after the reverse operation. Without the additional conveying element, there is a great difficulty in the state of the art in again drawing in the slug of crop deposited during the reverse operation, on a plate, also designated as center table, that is arranged over the center of two intake and mowing arrangements. Since the conveying element according to the invention, is positioned exactly in the location at which the slug of harvested crop was deposited, its conveying effect can be applied to great effect, without incurring any unnecessary friction losses.

The conveying arrangement is driven to rotate. For this purpose it can be connected to a shaft and optionally through a gearbox with an adjoining intake and mowing arrangement, which can also be brought into rotation by a drive.

BRIEF DESCRIPTION OF THE DRAWINGS

The drawings show an embodiment of the invention that shall be described in greater detail in the following.

DESCRIPTION OF THE PREFERRED EMBODIMENT

Figure 1:
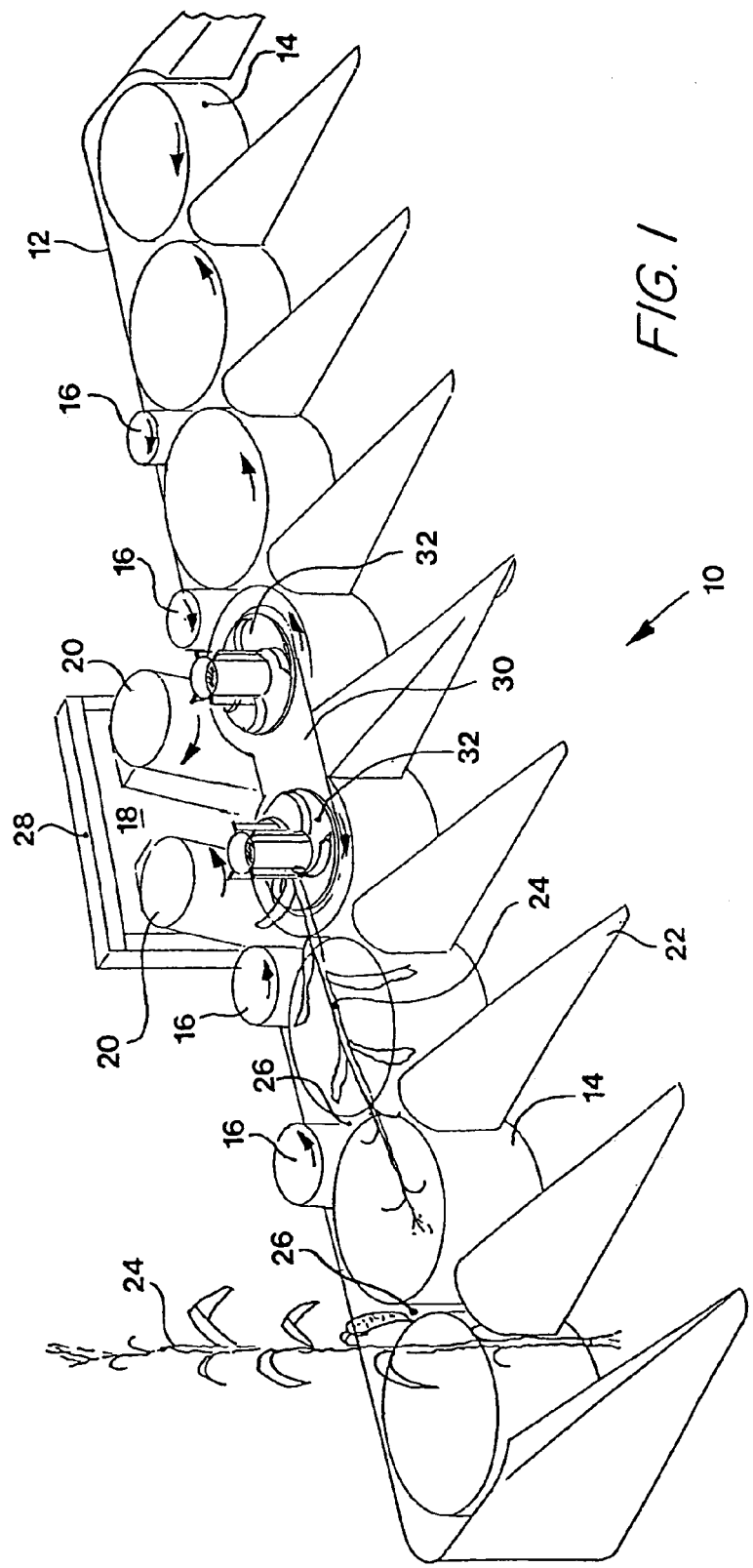
FIG. 1 shows a schematic perspective view of a machine for mowing stalk-like crops.

Referring to FIG. 1, there is shown a schematic of a machine 10 constructed according to the invention for mowing stalk-like harvesting crop. Eight intake and mowing arrangements 14 are attached to a frame 12 in side-by-side relationship to each other. The intake and mowing arrangements 14 consist, in a manner known in itself, of conveyor disks, having a multitude of pocket-shaped recesses distributed around their circumference, arranged coaxially above associated mower disks. The conveyor disks grasp and transport the stalk-like crop, that is cut from the surface of the field by means of the mower disks. The number of intake and mowing arrangements 14 of the machine 10 can be selected as desired, hence more or less than the eight intake and mowing arrangements 14 pictured in FIG. 1 can be applied.

On the rear side of the intake and mowing arrangements 14, the harvested crop is retrieved from the conveyor disks by clean-up devices (not shown in the drawings for the sake of clarity) that may be configured as rotating disks or fixed elements, and conveyed in a sideways direction to the center of the machine 10 by transverse conveyor drums 16 that interact with the intake and mowing arrangements 14 and that are equipped with projecting driver teeth and penetrate through corresponding slots in a rear wall of the machine 10. The intake channel 18 of a forage harvester is arranged on the center of the rear side of the machine 10. In the center of the machine 10, the harvested crop is conveyed by slope conveyor drums 20 arranged on both sides in the forward operating direction ahead of the intake channel 18 and which are also equipped with driver teeth. The axes of rotation of the slope conveyor drums 20 are inclined towards the front. The intake and mowing arrangements 14 are driven to rotate about approximately vertical axes of rotation, or axes of rotation inclined slightly in the forward direction. The transverse conveyor drums 16 and the slope conveyor drums 20 are also brought into rotation. The corresponding drive is provided by a self-propelled harvesting machine, as a rule, a forage harvester, whose intake channel 18 is arranged at the center of the rear side of the machine 10 and which moves the machine in the forward operating direction across a field. The machine 10 is fastened to the self-propelled harvesting machine by means of a carrier frame 28 so that it can be released. The direction of rotation of the intake and mowing arrangements 14 on one side of the center plane of the machine 10 is opposite to that of the intake and mowing arrangements 14 on the opposite side, where each of the three inner intake and mowing arrangements 14 rotate in the opposite direction to each of the intake and mowing arrangements 14 arranged at the outside.

When the machine 10 is moved over a field, the plants 24 standing there are pushed to the side if necessary by stalk dividers 22 and grasped by the intake and mowing arrangements 14, that operate independently of rows, and cut from the ground. Then the plants 24 are transported to the center of the machine 10 transverse to the forward operating direction in the transverse conveying channel 26 that is defined between the rear wall of the machine 10 and the transverse conveyor drums 16 on the one hand and the intake and mowing arrangements 14 on the other hand. When the harvested plants 24 arrive at the center of the machine 10, they are conveyed into the intake channel 18 by the slope conveyor drums 20.

It should be noted that the configuration of the transverse conveying channel 26 can be chosen freely within the framework of the idea of the invention. It may be a channel formed between the rear wall of the machine 10 and the intake and mowing arrangements 14 arranged ahead of the rear wall, as is shown in FIG. 1, through which the crop is transported by the intake and mowing arrangements 14 interacting with transverse conveyor drums 16 arranged behind these or with driven clean-up disks or transverse conveyor belts (DE 195 27 607 A, DE 195 31 918 A and DE 198 56 444 A). A transport of the harvested crop in the transverse conveying channel 26 independently of the intake and mowing arrangements 14 is also conceivable and can be accomplished by separate conveyors, for example, in the form of conveyor belts or screw conveyors (GB 2 012 154 A).

Particularly in case only one outer intake and mowing arrangement 14 is supplied with crop to be harvested, it is conceivable that individual harvested plants cannot be securely retained in the transverse conveying channel 26 because the supply of crop from the other intake and mowing arrangements 14 is insufficient. These plants 24 can fall over due to their relatively high center of gravity and escape with their lower end out of the transverse conveying channel 26 as is the case with the plant identified with the part number call-out 24' in FIG. 1. In such a case, it is possible that the plant 24' comes to lie on the plate-shaped center table 30 arranged between the two center intake and mowing arrangements 14.

Figure 2:
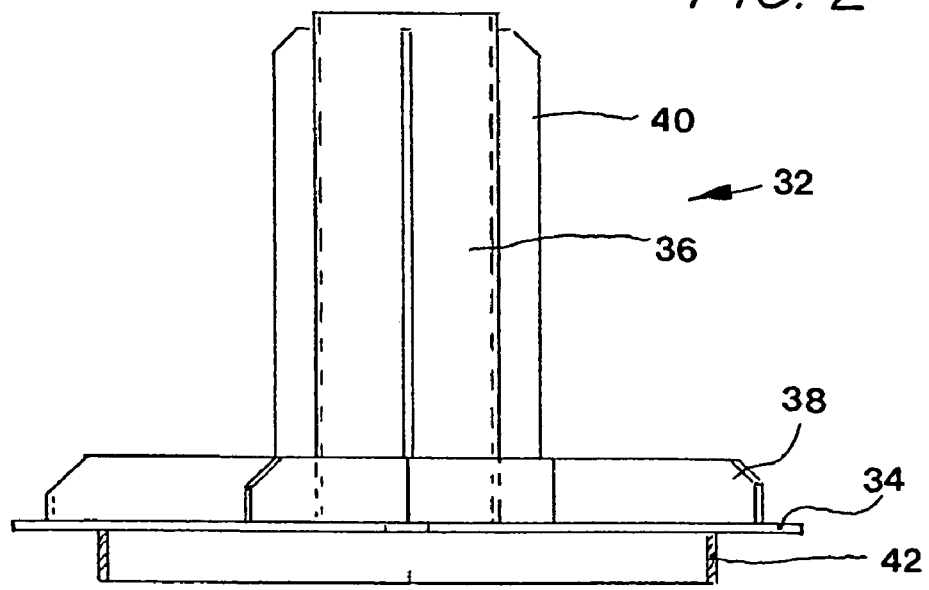
FIG. 2 shows a side view of a conveying arrangement of the machine according to FIG. 1.
Figure 3:
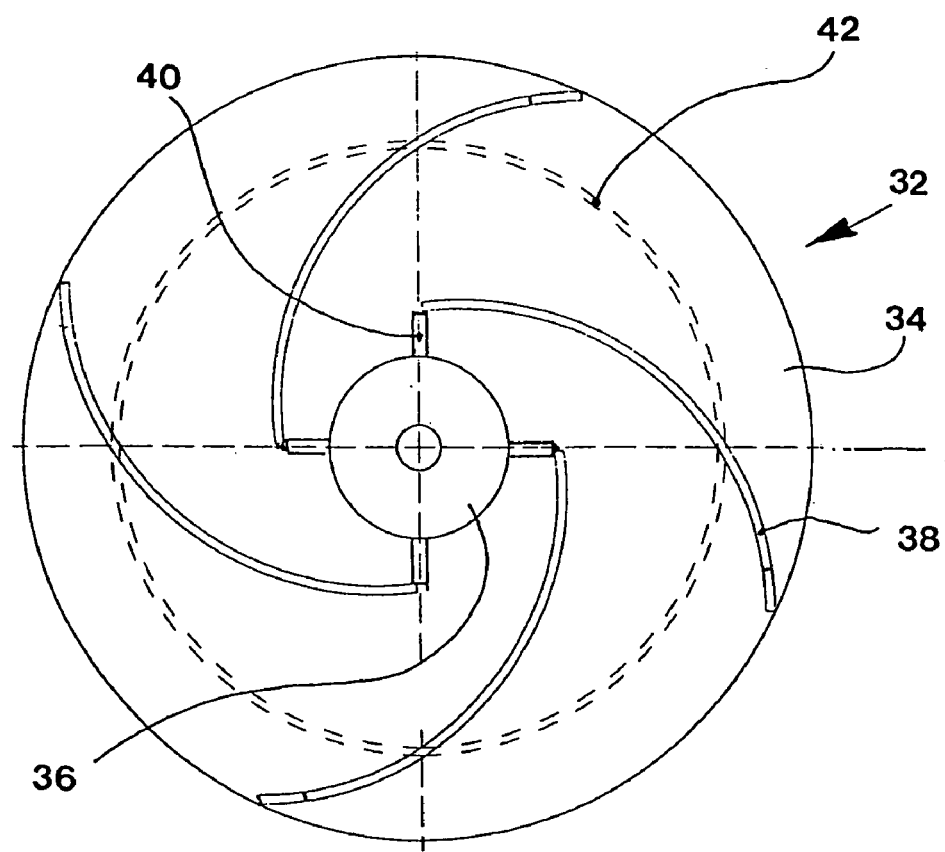
FIG. 3 shows a plan view of the conveying arrangement of FIG. 2.

In order to be able nevertheless to convey the plant 24' into the intake channel 18, two conveying arrangements 32 are arranged above the center table 30 on the upper side of the two central intake and mowing arrangements 14. The axes of rotation of the conveying arrangements 32 extend approximately vertically and are inclined slightly forward as are those of the intake and mowing arrangements 14. The conveying arrangements 32 are composed of a lower circular conveyor disk 34 and a cylindrical conveyor drum 36 arranged above it and coaxial to the conveyor disk 34, as can be seen in greater detail in FIGS. 2 and 3. The conveyor disk 34 is equipped with curved drivers 38 projecting upward. The curvature of the drivers 38 extends opposite to the direction of rotation, resulting in a rejecting conveying performance. To enhance the aggressive action, the upper side of the drivers 38 could be provided with triangular or saw-tooth-shaped projections. The conveyor drum 36 is also provided with drivers 40 which, however, are oriented radially. A cylindrical collar 42 extending downward as wrapping shield is attached to the underside of the conveyor disk 34.

The conveying arrangements 32 are arranged coaxially to each of the intake and mowing arrangements 14 arranged underneath each of them. Each conveying arrangement 32 is driven by a shaft and optionally connected to a gearbox so as to drive the intake and mowing arrangements 14 arranged underneath them.

The conveying arrangements 32 automatically convey plants 24' that have escaped from the transverse conveying channel 26 again into the transverse conveying channel 26 since the surface of the conveying arrangements 32 facing the escaped plants 24' rotates in the direction of the intake channel 18 in the normal harvesting operation, as is indicated by the arrows in FIG. 1. Thereupon the plants are conveyed into the intake channel 18 by the slope conveyor drums 20. The selected direction of rotation and the positioning of the conveying arrangements 32 have the advantage that the plants are conveyed aggressively and effectively.

Due to the coupling of the drives of the conveying arrangements 32 with the intake and mowing arrangements 14, the conveying arrangements 32 are driven in the opposite direction of rotation during the reverse operation of the machine 10. They support the deposit of harvested crop ejected from the intake channel 18 during the reverse operation on both outer sides of the center table 30. If the normal harvesting operation is again resumed after the reverse operation, the conveying arrangements 32 convey the harvested crop deposited on the center table 30 again into the transverse conveying channel 26 from which it reaches the intake channel 18. If the harvested crop is to be deposited in the center of the center table 30 during the reverse operation, the direction of rotation of the conveying arrangements 32 selected for the harvesting operation can also be maintained during the reverse operation and then briefly reversed before the resumption of the harvesting operation, in order to remove the plants from the center table 30.

Having described the preferred embodiment, it will become apparent that various modifications can be made without departing from the scope of the invention as defined in the accompanying claims.

The invention claimed is:

1. In a machine for mowing crop including: at least two intake and mowing arrangements arranged in side-by-side relationship to each other, with a pair of said intake and mowing arrangements being respectively located on opposite sides of a vertical plane extending in a direction of operation of said machine, said pair of intake and mowing arrangements being mounted for rotating in opposite directions about respective upright axes for cutting and conveying the harvested crop first transversely outwardly from a central plane and then rearwardly, a transverse conveying channel provided at a side of said at least two intake and mowing arrangements through which harvested crop can be transported at least approximately transverse to the direction of operation, an intake channel arranged along said vertical plane at a downstream end of the transverse conveying channel through which the harvested crop can be delivered to a chopper arrangement, and at least one driven conveying arrangement arranged outside the transverse conveying channel, in order to remove a jam if necessary that was caused by harvested crop that emerged from the transverse conveying channel, said pair of intake and mowing arrangements is located in the vicinity of and ahead of said intake channel; and said at least one conveying arrangement being arranged above one of said pair of intake and mowing arrangements, the improvement comprising: a plate-shaped center table located above said pair of said at least two intake and mowing arrangements; said at least one conveying arrangement being arranged on said plate-shaped center table said conveying arrangement being mounted for rotation about an approximately vertical axis, said at least one conveying arrangement includes a horizontal conveyor disk, said conveyor disk is equipped with drivers, said drivers of said conveyor disk extend radially and are shaped so as to trail a direction of rotation of said conveyor disk, said at least one conveying arrangement includes an upright conveyor drum located in coaxial relationship to, and joined to an upper surface of, said conveyor disk.

2. The machine, as defined in claim 1, wherein at least two conveying arrangements are respectively arranged above said pair of said at least two intake and mowing arrangements.

3. The machine, as defined in claim 2, wherein a plate-shaped center table extends between, and is located above, said pair of said at least two intake and mowing arrangements; and said at least two conveying arrangements being arranged on said center table at locations respectively above said pair of said intake and mowing arrangements.

4. The machine, as defined in claim 1, wherein said at least one conveying arrangement includes an upright conveyor drum.

5. The machine, as defined in claim 4, wherein said conveyor drum is equipped with drivers.

6. The machine, as defined in claim 1 wherein said at least one conveying arrangement is coupled so as to be driven together with said one of said pair of said at least two intake and mowing arrangements.

* * * * *